United States Patent [19]

Hannerz

[11] 4,048,090
[45] Sept. 13, 1977

[54] REACTOR FUEL IN THE FORM OF MIXED OXIDE PARTICLES AND A METHOD FOR MANUFACTURING SUCH MIXED OXIDE PARTICLES

[75] Inventor: Kåre Hannerz, Vasteras, Sweden

[73] Assignee: ASEA Aktiebolag, Vasteras, Sweden

[21] Appl. No.: 637,635

[22] Filed: Dec. 4, 1975

[30] Foreign Application Priority Data

Dec. 5, 1974 Sweden .............................. 7415226

[51] Int. Cl.² .............................................. G21C 3/62
[52] U.S. Cl. ...................... 252/301.1 R; 252/301.1 S; 264/.5; 427/6
[58] Field of Search .................. 252/301.1 S, 301.1 R; 427/5, 6; 264/.5; 176/91 SP, 83

[56] References Cited

U.S. PATENT DOCUMENTS

| 3,168,601 | 2/1965 | St. Pierre ................................ 264/0.5 |
| 3,290,122 | 12/1966 | Clinton et al. .................. 252/301.1 S |
| 3,329,745 | 7/1967 | Grange ..................................... 264/.5 |
| 3,340,567 | 9/1967 | Flack et al. ..................... 252/301.1 S |
| 3,495,954 | 2/1970 | Grimes et al. ................. 252/301.1 R |
| 3,514,412 | 5/1970 | Trigiani et al. ........................ 264/0.5 |

Primary Examiner—Edward A. Miller
Assistant Examiner—Deborah L. Kyle
Attorney, Agent, or Firm—Watson, Cole, Grindle & Watson

[57] ABSTRACT

A mixed oxide fuel of uranium dioxide and plutonium dioxide is in the form of mixed oxide particles with a diameter of 0.2 to 2 mm. A surface layer of the particles consists of $UO_2$ with a plutonium content per unit of volume of at most 15 per cent of the average plutonium content per unit of volume of the particle. The particles are formed by extrusion through a concentric nozzle. A water emulsion of uranium dioxide is first pumped through the inner nozzle, after which a water emulsion of plutonium dioxide is pumped through the outer nozzle. Thereafter a water emulsion of uranium dioxide is pumped through the outer nozzle to surround the plutonium dioxide layer and then water emulsion of uranium dioxide is pumped through the first nozzle to complete the enclosure of the plutonium dioxide.

6 Claims, 7 Drawing Figures

U.S. Patent  Sept. 13, 1977  4,048,090
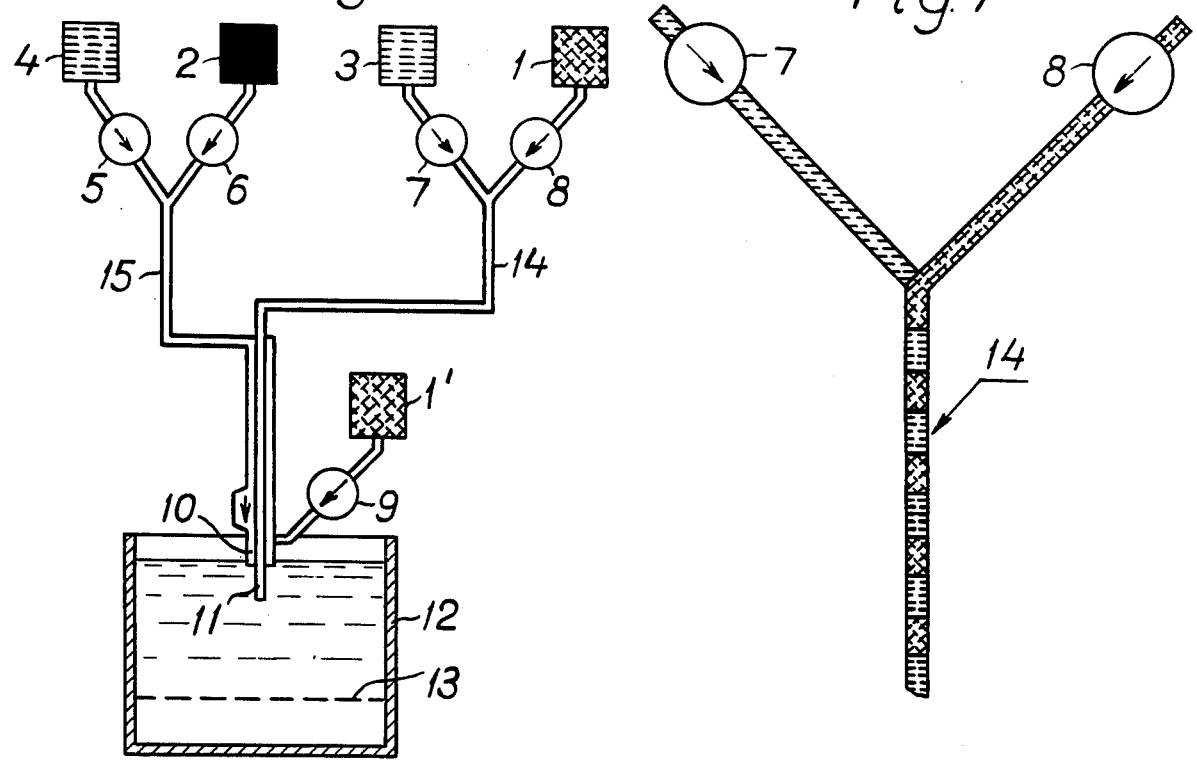

REACTOR FUEL IN THE FORM OF MIXED OXIDE PARTICLES AND A METHOD FOR MANUFACTURING SUCH MIXED OXIDE PARTICLES

BACKGROUND OF THE INVENTION

1. Field of the Invention

The present invention relates to a reactor fuel in the form of particles, each particle containing a mixture of plutonium dioxide and uranium dioxide, and to a method for manufacturing such particles.

2. The Prior Art

In traditional pellet manufacture of mixed oxide fuel starting from a mixture of uranium and plutonium oxide powder, there is a risk that plutonium-containing dust will be present in impermissibly high concentrations in working areas and in the surroundings.

SUMMARY OF THE INVENTION

This disadvantage is avoided by the invention which is based on the principle of constructing each fuel grain with an outer layer which has such a low plutonium content that dust emanating therefrom does not in itself constitute any danger, and which constitutes a safe canning of material lying inside, the dust from which is harmful.

One further advantage with the particles according to the invention is that after sintering they may be stored for an unlimited time and thereafter be used directly for manufacturing fuel rods by filling into zircaloy tubes. A suitable enrichment according to the specification adequate for each fuel delivery can be obtained by mixing a few available particle types with different enrichments. Because of the small number of manufacturing operations, this manufacture may be performed independently of a successively increasing buildup of the content of gamma-active americium 241, as opposed to the case when plutonium dioxide powder is the starting material. Further the alpha activity does not induce changes in the applicability of the particles for a continued manufacture of fuel after storing in the same way as is true of plutonium dioxide powder, because the alpha radiation is completely absorbed in the interior of the particles and does not affect the surface. Because of this it is practical, immediately in the reprocessing plant, to convert the plutonium to particles of the type described, before it is put in stock. This will also cause a radical reduction of the otherwise inconvenient amount of solid alpha active waste material which is the result of the manufacture of mixed oxide fuel according to the present conventional methods.

A mixed oxide particle according to the invention has a diameter of from 0.2 to 2 mm and a surface layer of $UO_2$ with a thickness of at least 0.05 mm and a high degree of purity, that is, with a plutonium content per volume unit of at the most 15% of the average plutonium content per volume unit of the particle.

The invention also relates to a method for manufacturing a mixed fuel particle which is formed with an outer, practically plutonium-free layer, more particularly according to the so-called "sol-gel" principle. This is known, among other things, from the publication "Sol-Gel Processes for Ceramic Nuclear Fuels," published by the International Atomic Energy Agency, Vienna, 1968. The present invention is a further development of said known process, and makes it possible to manufacture mixed oxide fuel grains with materials varying in layers, in particular with a plutonium-free surface layer.

According to the invention, the particles are formed in a nozzle having inner and outer parts by pumping water emulsion of uranium dioxide through the central part, then pumping water emulsion of plutonium dioxide through the outer nozzle to surround the uranium dioxide, then pumping a water emulsion of uranium dioxide through an outer nozzle to cover the plutonium dioxide and then pumping uranium dioxide through the inner nozzle to complete the enclosure of the plutonium dioxide.

BRIEF DESCRIPTION OF THE DRAWINGS

One example of the method for manufacturing particles will be explained in the following with reference to the accompanying drawings, in which FIG. 1 shows a system for carrying out the method, whereas FIGS. 2 to 6 show different stages in the manufacturing process.

FIG. 7 shows on an enlarged scale a detail of FIG. 1.

DESCRIPTION OF THE PREFERRED EMBODIMENTS

In the drawings, 1 and 1' designate containers for uranium oxide $UO_2$, which has low radioactivity, and 2 designates a container for plutonium dioxide, $PuO_2$ which, like $UO_2$, is supplied emulsified in water in the form of a so-called "sol." Although the chemical conditions of uranium and plutonium in the respective emulsions do not exactly correspond to the respective dioxides, these designations are used in the following.

3 and 4 are tanks which are filled with a hydrophobic solvent, for example paraffin, and 5, 6, 7, 8 and 9 designate pulse-controlled pumps having small stroke volumes. They are driven by electric motors, not shown in the drawing, which are supplied with electric pulses according to a permanent program which is repeated for each new fuel grain to be formed.

The annular nozzle 10 surrounds a tube with a central nozzle 11 and extends below the surface of a water-absorbing liquid in vessel 12. A large number of nozzles are connected to each dosing pump. The pipes and nozzles are made of water-repellent material, with the exception of the very tip of nozzle 11, which is made of hydrophilic material, for example glass.

At each stroke of the pump either paraffin, $UO_2$ or $PuO_2$ is driven through any of the nozzles 10 and 11. The finished droplets leave the nozzle 11 and sink deeper down into the vessel 12 which is filled with a strongly water-absorbing liquid, for example 2-ethyl hexanol. The jelly-like particles which are then formed are collected on a grid 13, from which they are transported to a drying and sintering plant to finally acquire the shape of solid, relatively hard fuel grains. Paraffin and ethyl hexanol are separated in a suitable plant, for example by means of distillation, and are returned to the process.

FIG. 7 shows in detail the resulting effect of the two pumps 7 and 9. In the capillary tube 14 strings of paraffin and of $UO_2$ solution alternate on their way towards the capillary nozzle 11. In a similar way alternate strings of alternate paraffin and $PuO_2$ solution follow after each other in the capillary tube 15.

As is clear from FIGS. 2 and 3, the particle formation is started by supplying $UO_2$ to the nozzle 11 and pressing it out through this nozzle, so that a small primary droplet 16 of $UO_2$ is formed. Thereafter a string 17 of $PuO_2$ comes through the nozzle 10 and covers the main part of the surface of the primary droplet 16 with a layer 18 of $PuO_2$, as shown in FIG. 4. After an interval with paraffin, a string of $UO_2$ solution then comes from container 1' through nozzle 10 and forms a $UO_2$ layer 19, which surrounds practically the whole $PuO_2$ layer 18. A complete enclosure is achieved by a final supply of $UO_2$ solution through the nozzle 11, the particle then being repelled from the nozzle. As is indicated in the drawing, the particle has a spherical or almost spherical shape.

FIG. 6 shows at the bottom the finished particle on its way towards the collecting grid 13.

The collected particles are dried and thereafter subjected, in a manner known per se, to a heating to such a high temperature that sintering takes place within each particle.

The proposed process is only one of several feasible processes in order to form the mixed oxide particle with a plutonium oxide-free surface layer.

1. Mixed oxide fuel consisting essentially of uranium dioxide and plutonium dioxide in the form of mixed oxide particles with a diameter of 0.2 to 2 mm, a surface layer of the particles consisting essentially of $UO_2$ having a thickness of at lest 0.05 mm with a plutonium content per unit of volume of at the most 15% of the average plutonium content per unit of volume of the particle.

2. Method for manufacturing mixed oxide fuel according to claim 1, comprising the steps of forming drops of an aqueous suspension of $PuO_2$ solution in a vessel containing a water-absorbing solvent, enclosing each of said drops with a drop of an aqueous suspension $UO_2$ solution to form composite drops in which each drop of $PuO_2$ suspension is enclosed by a layer of $UO_2$ suspension separating from said water-absorbing solvent gel particles resulting from said composite drops, and drying said gel particles.

3. Method according to claim 2, which comprises:
   first, forming the interior part (16) of the droplet by pumping a water suspension of uranium dioxide through a first, central nozzle (11) which is surrounded by a second, coaxially formed nozzle (10) having an annular cross-section,
   second, pumping a predetermined amount of a water suspension of plutonium dioxide through said second nozzle (10),
   third, pumping a predetermined amount of a water suspension of uranium dioxide through the second nozzle (10), and
   fourth, pumping a predetermined amount of a water suspension of uranium dioxide through said first nozzle (11).

4. Method according to claim 3, which comprises pumping through the second nozzle between the second and third pumping steps a liquid which is not capable of mixing with the fuel suspensions.

5. Method according to claim 3, in which the conduits and nozzles are made of water-repellent material, with the exception of the tip of said first nozzle (11) which is formed of a hydrophilic material.

6. A method of forming mixed oxide fuel particles of uranium dioxide and plutonium dioxide in the form of mixed oxide particles with a diameter of 0.2 to 2 mm, a surface layer of the particles consisting essentially of $UO_2$ having a thickness of at least 0.05 mm in an apparatus which includes a first nozzle and a second nozzle concentric with and surrounding the first nozzle, and extending below the surface of a water-absorbing solution, which comprises forming in the second nozzle a slug of water suspension of plutonium dioxide, followed by a slug of a liquid not capable of mixing with water suspensions of uranium dioxide or plutonium dioxide, and a slug of water suspension of uranium dioxide, extruding a predetermined amount of the uranium dioxide suspension from the first nozzle into the solution to form a core of uranium dioxide, discontinuing the feeding through the first nozzle, then extruding the slug of plutonium dioxide from the second nozzle to form a layer around the core, then extruding the slug of said liquid, then extruding the slug of uranium dioxide from the second nozzle to surround almost completely the layer of plutonium dioxide, then discontinuing the feed of uranium oxide suspension from the second nozzle and then extruding further uranium oxide suspension from the first nozzle to complete the surrounding of the layer of plutonium dioxide.

* * * * *